US010635707B2

United States Patent
Perez et al.

(10) Patent No.: US 10,635,707 B2
(45) Date of Patent: Apr. 28, 2020

(54) CONTEXTUAL MEMORY BANDIT FOR PROACTIVE DIALOGS

(71) Applicant: Xerox Corporation, Norwalk, CT (US)

(72) Inventors: Julien Perez, Grenoble (FR); Tomi Silander, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 213 days.

(21) Appl. No.: 15/697,589

(22) Filed: Sep. 7, 2017

(65) Prior Publication Data
US 2019/0073363 A1  Mar. 7, 2019

(51) Int. Cl.
| | | |
|---|---|---|
| *G06F 16/907* | (2019.01) | |
| *G06F 16/335* | (2019.01) | |
| *G06F 16/332* | (2019.01) | |
| *G06F 16/435* | (2019.01) | |

(52) U.S. Cl.
CPC .......... *G06F 16/435* (2019.01); *G06F 16/335* (2019.01); *G06F 16/3329* (2019.01); *G06F 16/907* (2019.01)

(58) Field of Classification Search
None
See application file for complete search history.

(56) References Cited

U.S. PATENT DOCUMENTS

| | | | |
|---|---|---|---|
| 9,179,258 B1 * | 11/2015 | Siegel | ................... H04W 4/029 |
| 9,977,778 B1 | 5/2018 | Perez et al. | |
| 10,049,103 B2 | 8/2018 | Perez et al. | |
| 2015/0095033 A1 | 4/2015 | Boies et al. | |
| 2016/0173690 A1 | 6/2016 | Perez et al. | |
| 2017/0091171 A1 | 3/2017 | Perez | |
| 2017/0200077 A1 | 6/2017 | Weston et al. | |
| 2017/0278114 A1 | 9/2017 | Renders | |
| 2017/0316775 A1 * | 11/2017 | Le | ........................... G10L 15/16 |
| 2018/0137854 A1 | 5/2018 | Perez | |
| 2018/0232152 A1 | 8/2018 | Perez et al. | |

(Continued)

OTHER PUBLICATIONS

A Beginner's Guide to Attention Mechanisms and Memory Networks [date unknown], skymind.ai, https://skymind.ai/wiki/attention-mechanism-memory-network.*

(Continued)

*Primary Examiner* — Jason G Liao
(74) *Attorney, Agent, or Firm* — Fay Sharpe LLP

(57) ABSTRACT

A proactive interaction system includes memory which stores a contextual model. The contextual model includes supporting memory storing a representation of each of a set of past observations. Each of the past observations having an observed reward for a respective user for a respective action selected from a set of candidate actions. The contextual model is configured for estimating a reward for each of a current set of candidate actions, based on the stored representations of past observations and a representation of a current user. Each candidate action is associated with a respective action representation. A contextual bandit selects one of the candidate actions, based on the estimated reward for each of the set of candidate actions, to optimize a cumulative reward over a sequence of candidate action selections. An act output component performs a user-detectable act based on the selected one of the candidate actions.

18 Claims, 5 Drawing Sheets

(56) References Cited

U.S. PATENT DOCUMENTS

2018/0348716 A1  12/2018  Perez et al.

OTHER PUBLICATIONS

Robbins, Some Aspects of the Sequential Design of Experiments 1952, Bulletin of the American Mathematical Society, pp. 527-535.*

Bouneffouf, Context Attentive Bandits: Contextual Bandit with Restricted Context Aug. 19-25, 2017, IJCAI-17, pp. 1468-1475.*

Allesiardo, A Neural Networks Committee for the Contextual Bandit Problem Sep. 29, 2014, arxiv, https://arxiv.org/pdf/1409.8191.pdf.*

Vaswani et al., Attention Is All You Need Jun. 30, 2017, arXiv.org, version 4, https://arxiv.org/abs/1706.03762v4.*

Rob, Email Marketing—What is it? Why do it? And How? Sep. 5, 2011, crossXware, https://www.crossware.co.nz/blog/email-marketing-what-is-it-why-do-it-and-how/.*

Criteria date unknown [captured by archive.org on Jan. 10, 2017], acceptableads.com, https://web.archive.org/web/20170110135018/https://acceptableads.com/about/criteria.*

Agrawal, et al., "Thompson sampling for contextual bandits with linear payoffs," ICML, vol. 28 of JMLR Workshop and Conf. Pro., pp. 127-135 (2013).

Bahdanau, et al., "Neural machine translation by jointly learning to align and translate," ArXiv1409.0473, pp. 1-15 (2014).

Baumann, et al., "Evaluation and optimization of incremental processors," Dialogue and Discourse vol. 2(1), pp. 113-141 (2011).

Blei, et al., "Latent Dirichlet Allocation," J. Machine Learning Research 3, pp. 993-1022, (2003).

Chapelle, et al., "An empirical evaluation of Thompson sampling," Advances in neural information processing systems (NIPS), pp. 2249-2257 (2011).

Chu, et al., "Contextual bandits with linear payoff functions," International Conference on Artificial Intelligence and Statistics (AISTATS), vol. 15 of JMLR Proc., pp. 208-214 (2011).

Hausknecht, et al., "Deep recurrent Q-learning for partially observable MDPs," ArXiv1507.06527, Sequential Decision Making for Intelligent Agents Papers from the AAAI 2015 Fall Symposium, pp. 29-37 (2015).

Hochreiter, et al., "Long short-term memory," Neural Computation vol. 9(8), pp. 1735-1780 (1997).

Jonsdottir, et al., "Learning smooth, human-like turntaking in realtime dialogue," International Workshop on Intelligent Virtual Agents, Springer, Berlin, Heidelberg, pp. 162-175 (2008).

Kakade, et al., "Efficient bandit algorithms for online multiclass prediction," Proc. 25th Int'l Conf. on Machine Learning (ICML), pp. 440-447, ACM (2008).

Khouzaimi, et al., "Reinforcement learning for turntaking management in incremental spoken dialogue systems," Proc. 25th Int'l Joint Conf. on Artificial Intelligence (IJCAI), pp. 2831-2837 (2016).

Kim, "Convolutional neural networks for sentence classification," Proc. 2014 Conf. on Empirical Methods in Natural Language Processing (EMNLP), ACL, pp. 1746-1751 (2014).

Li, et al., A contextual-bandit approach to personalized news article recommendation Proc. 19th Int'l Conf. on World Wide Web (WWW 2010), ACM, pp. 661-670 (2010).

Liu, et al., "Gated end-to-end memory networks," Proc. 15th Conf. of the European Chapter of the Assoc. for Computational Linguistics (EACL 2016), vol. 1, Long Papers, pp. 1-10 (2016).

Lu, et al., "Contextual multi-armed bandits," Proc. 13th Int'l Conf. on Artificial Intelligence and Statistics (AISTATS), pp. 485-492 (2010).

Oh, et al., "Control of memory, active perception, and action in minecraft," arXiv:1605.09128, published in Proc. 33nd Int'l Conf. on Machine Learning (ICML 2016), pp. 2790-2799 (2016).

Sorokin, et al., Deep attention recurrent Q-network. ArXiv 1512.01693, pp. 1-7 (2015).

Sukhbaatar, et al., "End-to-end memory networks," Advances in Neural Information Processing Systems (NIPS), 28, pp. 2440-2448 (2015).

Tang, et al., "Ensemble contextual bandits for personalized recommendation," Proc. 8th ACM Conf. on Recommender Systems (RecSys '14), pp. 73-80 (2014).

Williams, et al., "Partially observable Markov decision processes for spoken dialog systems," Computer Speech & Language vol. 21(2), pp. 393-422 (2007).

Zhou, A survey on contextual multi-armed bandits, ArXiv 1508.03326, pp. 1-43 (2015).

Perez, Julien, Dialog State Tracking with a Prior Knowledge-Driven Relational Representation Learning Approach; U.S. Appl. No. 15/451,860, filed Mar. 7, 2017.

* cited by examiner

CONTEXTUAL MEMORY BANDIT FOR PROACTIVE DIALOGS

BACKGROUND

The exemplary embodiment relates to a system and method employing a model for proactively proposing an action, given a sequence of observations. The system and method find particular application in connection with dialog management systems, recommender systems, and other systems where a set of past observations is useful in predicting actions.

Automated dialog systems interact with users in a natural language, often to help them achieve a goal. As an example, a user may be interested in finding a restaurant and may have a set of constraints, such as geographic location, date, and time. The system, acting as a virtual, conversational agent, offers the name of a restaurant that satisfies the constraints. The user may then request additional information about the restaurant. The dialogue continues until the user's questions are answered. There are many other applications where dialog systems may find application, such as in customer call centers.

Current task-oriented dialog systems are generally designed to be reactive, with users initiating conversations. See, for example, Jason D. Williams, et al., "Partially observable Markov decision processes for spoken dialog systems," Computer Speech & Language 21(2):393-422, 2007. Conventional dialog systems maintain a distribution over latent variables composing the state of the current dialog. There are three basic choices faced by the agent: a) let the user continue to speak, b) repeat a term said by the user for implicit confirmation, and c) ask the user to repeat for disambiguation or explicit confirmation. Rule-based systems have been developed to make such choices. See, Timo Baumann, et al., "Evaluation and optimization of incremental processors," Dialogue and Discourse 2(1):113-141, 2011. Alternatively, they can be formalized as a delayed reward control tasks that can be solved using reinforcement learning. See, Hatim Khouzaimi, et al., "Reinforcement learning for turntaking management in incremental spoken dialogue systems," Proc. 25th Int'l Joint Conf. on Artificial Intelligence (IJCAI), pp. 2831-2837, 2016.

Incremental approaches to conversation have involved studying the usage of spontaneous dialog act emission as part of an active comprehension mechanism. See, Gudny Ragna Jonsdottir, et al., "Learning smooth, human-like turntaking in realtime dialogue," Int'l Workshop on Intelligent Virtual Agents, pp. 162-175, 2008.

To enhance the usability of conversational agents, it would be desirable for them to be more proactive. Proactive interaction is defined as the faculty of a conversational agent to spontaneously address the user, independently of user interactions. Such agents could initiate conversations on their own. In such proactive dialog systems, the agent could infer, given a set of observed variables, the pertinence of a given suggestion or piece of conversation and could also be able to learn from user feedback. For example, a conversational assistant in a vehicle could use a voice interface to warn a driver proactively about a potential traffic jam ahead. Similarly, a personal assistant agent could suggest a venue based on the current location of its user and his interests.

One problem in designing a proactive conversation agent is the absence of full feedback. The present system and method enables a conversation agent to infer the quality of its proactive decisions from the partial feedback given by the user in prior interactions.

INCORPORATION BY REFERENCE

The following references, the disclosures of which are incorporated herein by reference in their entireties, are mentioned:

U.S. application Ser. No. 15/608,129, filed May 30, 2017, entitled NON-MARKOVIAN CONTROL WITH GATED END-TO-END MEMORY POLICY NETWORKS, by Julien Perez and Tomi Silander.

U.S. application Ser. No. 15/451,860, filed Mar. 7, 2017, entitled DIALOG STATE TRACKING WITH A PRIOR KNOWLEDGE DRIVEN RELATIONAL REPRESENTATION LEARNING APPROACH, by Julien Perez.

U.S. application Ser. No. 15/429,344, filed Feb. 10, 2017, entitled GATED END-TO-END MEMORY NETWORK, by Julien Perez, et al.

U.S. application Ser. No. 15/407,713, filed Jan. 17, 2017, entitled AUTHOR PERSONALITY TRAIT RECOGNITION FROM SHORT TEXTS WITH A DEEP COMPOSITIONAL LEARNING APPROACH, by Julien Perez, et al.

U.S. application Ser. No. 15/350,269, filed Nov. 14, 2016, entitled MACHINE READING METHOD FOR DIALOG STATE TRACKING, by Julien Perez.

U.S. application Ser. No. 15/342,590, filed Nov. 3, 2016, entitled PROBABILISTIC MATCHING FOR DIALOG STATE TRACKING WITH LIMITED TRAINING DATA, by Julien Perez, et al.

U.S. application Ser. No. 15/079,669, filed Mar. 24, 2016, entitled ADAPTIVE COLLABORATIVE FILTERING WITH EXTENDED KALMAN FILTERS AND MULTI-ARMED BANDITS, by Jean-Michel Renders.

U.S. Pub No. 20160173690, published Jun. 16, 2016, entitled SPECTRAL DIAGNOSTIC ENGINE FOR CUSTOMER SUPPORT CALL CENTER, by Julien Perez, et al.

U.S. Pub No. 20170200077, published Jul. 13, 2017, entitled END-TO-END MEMORY NETWORKS, by Weston, et al.

BRIEF DESCRIPTION

In accordance with one aspect of the exemplary embodiment, a proactive interaction system includes memory which stores a contextual model. The contextual model includes supporting memory storing a representation of each of a set of past observations. Each of the past observations having an observed reward for a respective user for a respective action selected from a set of candidate actions. The contextual model is configured for estimating a reward for each of a current set of candidate actions, based on the stored representations of past observations and a representation of a current user. Each candidate action is associated with a respective action representation. A contextual bandit selects one of the candidate actions, based on the estimated reward for each of the set of candidate actions, to optimize a cumulative reward over a sequence of candidate action selections. An act output component performs a user-detectable act based on the selected one of the candidate actions. The system may further include one or more of a reward computation component computes an observed reward for the selected action, based on an observed user response to the user-detectable act, and an observation component updates the supporting memory with a new observation for the user and selected action, based on the reward.

A processor may implement the contextual bandit, act output component, reward computation component, and observation component.

In accordance with another aspect of the exemplary embodiment, a proactive interaction method includes providing, in memory, a contextual model. The contextual model includes supporting memory storing representations of each of a set of past observations for which there is an observed reward for a respective user for a respective action selected from a set of candidate actions. The contextual model is configured for estimating a reward for each of a set of candidate actions, based on the stored representations of past observations and a representation of a current user, each candidate action being associated with a respective action representation. For a sequence of iterations, the method includes, for a current user, with the model, computing an expected reward for each of a set of candidate actions and, for at least one iteration in the sequence of iterations, sampling one of the candidate actions based on the estimated reward for each of the set of candidate actions to optimize a cumulative reward over a sequence of candidate action selections, outputting a user-detectable act, based on the selected one of the candidate actions, computing a reward for the selected action based on an observed user response to the user-detectable act, and updating the supporting memory with a new observation for the user and selected action, based on the reward.

In accordance with another aspect of the exemplary embodiment, a proactive dialog system includes memory which stores a contextual model, the contextual model including supporting memory storing representations of each of a set of past observations for which there is an observed reward for a respective user for a respective action selected from a set of candidate actions, the contextual model configured for estimating a reward for each of a set of candidate actions based on the stored representations of past observations and a representation of a current user, each candidate action being associated with a respective action representation. Instructions are stored in memory which, for a sequence of iterations: for a current user, with the model, computing an expected reward for each of a set of candidate actions; and for at least one iteration in the sequence of iterations: sampling one of the candidate actions based on the estimated reward for each of the set of candidate actions to optimize a cumulative reward over a sequence of candidate action selections, outputting a user-detectable utterance, based on the selected one of the candidate actions, computing a reward for the selected action based on an observed user response to the user-detectable act, and updating the supporting memory with a new observation for the user and selected action, based on the reward.

The instructions may be implemented with a processor.

DETAILED DESCRIPTION

Figure 1:
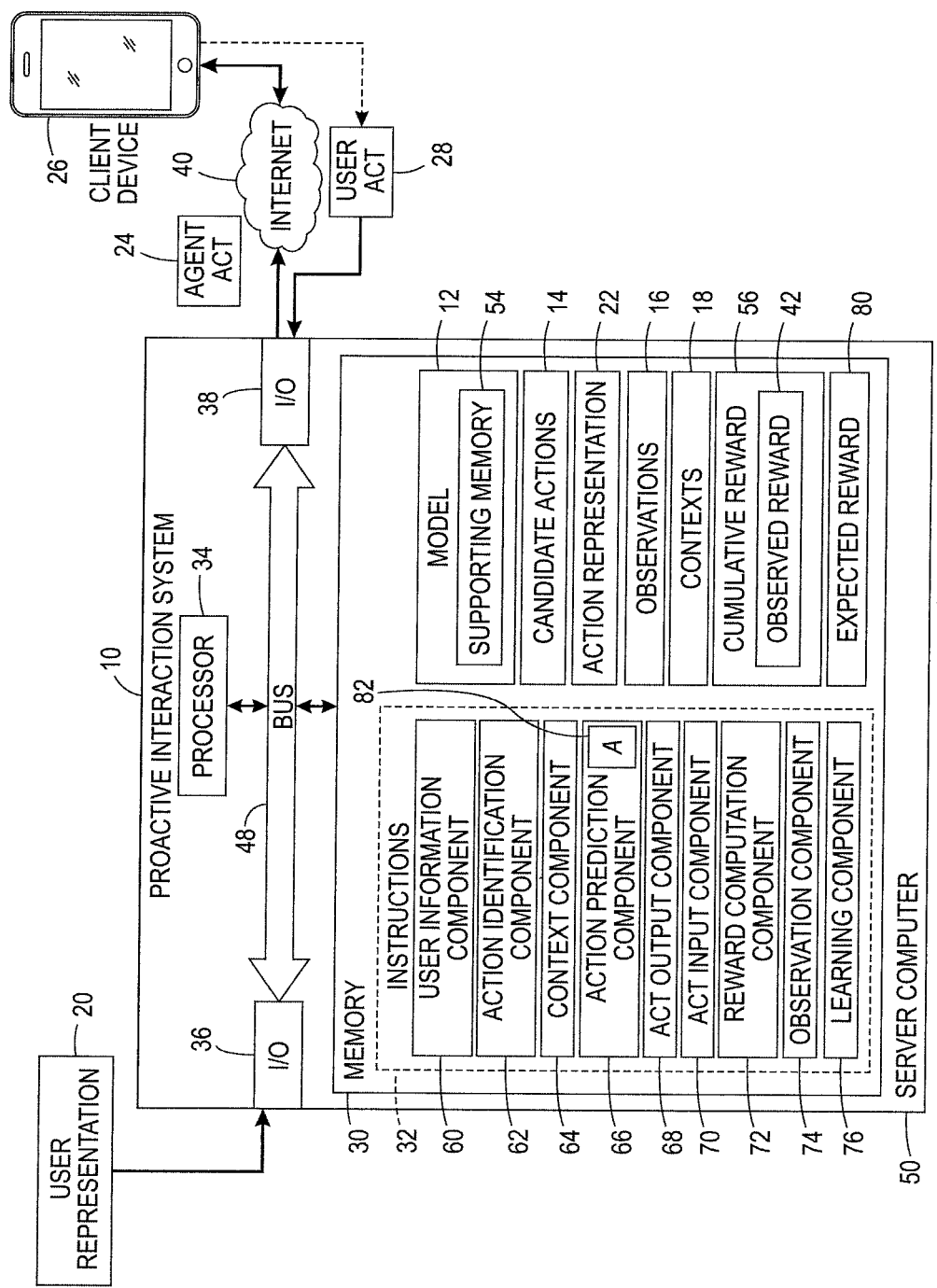
FIG. 1 is a functional block diagram of a proactive interaction system in accordance with one aspect of the exemplary embodiment.

Aspects of the exemplary embodiment will now be described in connection with a proactive interaction system and method in which a conversational agent determines a time and a content of an interaction initiated with a user, based on contextual information. To identify an action, such as a dialog act, from a set of possible actions, the agent employs a contextual bandit. The contextual bandit addresses the problem of reward maximization, given only partial feedback from the user. A parametric reward estimation function includes a contextual model for predicting a reward for a given action. The model includes memory which incorporates past observations. Two examples of contextual models that can act as parts of the parametric reward estimation function are described herein. The first one, a Convolutional Selective Memory Network (CSMN), uses a selection of past interactions as part of the decision support. The second model, referred to as a Contextual Attentive Memory Network (CAMN), implements a differentiable attention mechanism over the past interactions of the agent. These models adapt the conventional model of contextual bandits to settings where temporal information can be incorporated and leveraged in a learnable manner. The usability and performance of the contextual model for building a proactive mobile assistant is described by way of example.

In the CAMN model, the differentiable attention mechanism is computed over a potentially long, history of contexts. The CAMN model can be a trained, Gated end-to-end memory network (GMemN2N), as described, for example, in Julien Perez and Fei Liu, "Gated end-to-end memory networks," Proc. 15th Conf. of the European Chapter of the Assoc. for Computational Linguistics (EACL 2016), Vol. 1, Long Papers, pp. 1-10, 2016) and in above-mentioned U.S. application Ser. Nos. 15/429,344 and 15/608,129.

In the exemplary proactive interaction system, the agent selects both the timing and the content of the dialog act(s) based on a) a current perceived context, b) its knowledge about the user, and c) the reward function to be optimized. The exemplary system uses a contextual bandit to infer a function that maps the observation and available prior knowledge to the expected reward of a candidate action. Using a variety of observed and inferred variables from the current perceived context and/or prior knowledge available, the conversational agent chooses either to continue to observe silently or to Initiate a conversation regarding a certain subject (such as suggesting a task to complete, display a reminder or propose a recommendation). However, rather than simply choosing an agent action which maximizes the expected reward, an exploration-exploitation approach is used to address the partial user feedback.

As used herein, a "conversational agent," or simply an "agent," Is a computer-implemented active decision-making entity which interacts with a user, e.g., through dialog and/or other agent acts recognized by the user, such as an audible alarm, visual information, such as an image or video, or the like.

A "user" can be any person or group of persons interacting with the conversational agent, e.g., through dialog and/or through other user acts detectable by the conversational agent. As an example, in response to an agent utterance that there is a restaurant nearby that a vehicle driver (or pedestrian) may like, the user could make a turn from the planned route, ask for directions to the restaurant from the system, or not perform a detectable user act.

An "action" may correspond to a respective topic, such as a restaurant or other point of interest (POI) in the vicinity, in the example above. Points of interest may include restaurants, gas stations, hotels, tourist attractions, schools, government buildings, or the like, depending on the application. Other actions may relate to events, such as concerts, theater performances, traffic-related events, such as accidents, blockages, etc., weather related events, such as an impending rainstorm, based on the application. At any given time, there may be a set of candidate actions from which the system can select.

A "context" includes information for a current user and for one of the set of candidate actions. The user information and action information may be in the form of feature vectors. The context may be a dot product, concatenation, or other aggregation of these feature vectors.

An "agent act" is performed by the agent to implement a selected action or to interact with the user in a subsequent dialog and can be, for example, and utterance or a physical act. A "user act" or "observed user response" is performed by the user in response to an agent act and is detectable by the system, and can be, for example, and utterance or a physical act.

An "observation" includes information about a context for a selected action and an associated reward. The reward is computed as a function of an observed user's act (including no act) which is responsive to an agent act implementing the selected action. A set of past observations (or functions thereof) may be stored in memory of the contextual model. The observations may be stored as tuples, which each include the context and the reward.

The contextual model serves as a "reward function," which maps each of a set of considered contexts to a single number, a reward, indicating the intrinsic desirability of an action. An objective of the contextual bandit is to maximize the total reward it receives in the long run.

With reference to FIG. 1, a computer-implemented proactive interaction system 10 is configured for learning a contextual model 12 for use in initiating an action by a (virtual) conversation agent which is recognizable by a user, and/or for employing the learned contextual model 12. Learning includes learning parameters θ of the model 12. The exemplary contextual model 12 is used to select an action from a set of at least two candidate actions 14, which may include an action corresponding to "no action". The prediction is based on a set of prior observations 16 and a current set of contexts 18. Each context 18 is derived from information about the current user and information about the candidate action. The user and action information can be stored in the form of feature-based representations 20, 22. The system selects and implements an agent act 24, based on the selected action 14.

The exemplary system 10 is described in terms of a dialog system in which the selected action 14 is used to generate and output an agent act 24 in the form of an agent utterance. The utterance may be output directly to a user by a suitable audio device, such as a loudspeaker, or sent to a linked user device 26 for output. The utterance 24 may be audible or textual, such as a suggestion related to the selected action 14. In the exemplary embodiment, the interaction system 10 is configured for conducting a proactive dialog in a natural language, such as English or French, between the agent and the user, which is initiated by a first utterance output by the system and wherein one or more subsequent user acts 28, in the form of user utterances, may be received by the system. However, other types of user acts and agent acts are contemplated.

The system 10 includes memory 30, which stores the contextual model 12 as well as instructions 32 in the form of software, for performing the exemplary method. A processor 34, in communication with the memory 30, executes the instructions. In particular, the processor 34 executes instructions for performing the method outlined in FIG. 2. The processor may also control the overall operation of the computer system 10 by execution of processing instructions which are stored in memory 30. Computer system 10 also includes one or more input/output (I/O) interface(s) 36, 38 for communicating with external devices, such as client device(s) 26 which receives or otherwise detects the agent act 24, e.g., via wired or wireless links 40, such as a cable, local area network, telephone line, or a wide area network, such as the Internet. The client device 26, or the user directly, may output the user act 28, such as a user utterance or other detectable act, which is used to compute an observed reward 42. The computed reward, together with the context (which formed the basis of the agent act to which the user act is inferred to be responsive) may be incorporated into a new observation 16. The system 10 receives and/or generates the user representation 20, which may be derived from a variety of sources, depending on the application. In the case of the restaurant suggestion system exemplified above, for example, the user information may include a representation of the user's past restaurant reviews. Some of the user information may be supplied by the user directly, e.g., in response to a questionnaire (e.g., "rate the following types of food"). The user information 20, or information from which it is generated, may be received via one or more input/output (I/O) interface(s) 36, 38 and stored in memory 30.

The various hardware components 30, 34, 36, 38 of the computer system 10 may be connected by a data/control bus 48. The system may be hosted by one or more computing devices, such as the illustrated server computer 50. The remote computing device 26 may serve as a user interface and/or a user interface may be linked directly to the computer 50.

The model 12 includes supporting memory 54 composed of memory cells, which are used to store information based on the observations 16. The goal of model learning is to adapt parameters of the model 12 to optimize a cumulative reward 56 over a sequence of actions over a period of time.

The computer system 10 and/or client device 26 may each include one or more of a microprocessor, a PC, such as a desktop, a laptop, palmtop computer, portable digital assistant (PDA), server computer, cellular telephone, tablet computer, pager, combination thereof, or other computing device capable of executing Instructions for performing the exemplary method.

The memory 30 may represent any type of non-transitory computer readable medium such as random access memory (RAM), read only memory (ROM), magnetic disk or tape, optical disk, flash memory, or holographic memory. In one embodiment, the memory 30 comprises a combination of random access memory and read only memory. The network interface(s) 36, 38 may each comprise a modulator/demodulator (MODEM) a router, a cable, and and/or Ethernet port. Memory 30 stores processed data, such as candidate actions 14, in addition to the instructions 32 and model 12, and may be distributed over one, two or more computing devices. The digital processor 34 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may Include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 32 include a user information component 60, an action identification component 62, a context component 64, an action prediction component 66, an agent act output component 68, a user act input component 70, a reward computation component 72, an observation component 74, a learning component 76, an action prediction component 68, an output component 70 and an execution component 72.

Briefly, the user information component 60 generates and/or receives user information 20 for at least one user, e.g., for a set of two or more users. The user information 20 for each user may be in the form of a respective multidimensional feature vector, e.g., a vector of at least 10 or at least 100 features.

The action identification component 62 identifies a set of candidate actions 14. The set of candidate actions may be fixed in advance or may vary over time. As an example, there may be at least two or at least three or at least four candidate actions (including the "no action"), such as up to 10,000 or up to 1000 or up to 100. For example, in the restaurant suggestion case mentioned above, as the vehicle moves, the set of candidate actions may correspond to the restaurants within a predetermined radius or driving distance/time of the vehicle or a subset thereof, such as the up to ten closest. Each action 14 is associated with action information 22, which may be in the form of a respective multidimensional feature vector, e.g., a vector of at least 10 or at least 100 features. In one embodiment, the user information 20 and action information 22 are multidimensional vectors which include the same set of features and may have the same number of dimensions. In one embodiment, the features of the user information 20 and action information 22 are derived from a bag of words representation of the user (resp. action), or, more formally, a bag of n-grams, where n is at least 1). As an example, n-grams are extracted from text provided by the user (e.g., restaurant reviews, emails, or the like) and the user information 20 is a statistical representation of the extracted n-grams. In other embodiments, the n-grams are associated with different topics in a set of topics and the user information 20 and action information 22 are statistical representations of the topics.

The context component 64 computes, for each candidate action 14, a respective context 18 as a function of the user information 20 for a current user and the action information 22.

The action prediction component 66 identifies one of the candidate actions 14 using the contextual model 12. In the exemplary embodiment, the model 12 is used to predict an expected reward 80 for each of at least some of the candidate actions and to select one of the candidate actions 14 based, in part, on the predicted rewards. The action prediction component 66 incorporates a contextual bandit 82 which attempts to maximize the cumulative reward 56 over a sequence of selected actions by combining exploration with the prediction.

The agent act output component 68 implements an agent act 24 based on the selected candidate action (which for some times results in no act being performed when the selected action corresponds to "no action"). In a dialog system, the act output component 68 may include components which generate an utterance in a natural language, such as a suggestion about the selected action.

The user act input component 70 detects a user act 28 that is inferred to be responsive to the agent act, e.g., which is detected within a predetermined time of the agent act being performed. In the case of a dialog system 10, the act input component 70 may include components which convert a user utterance to a form which can be processed by the dialog system in order to generate further agent acts to advance the dialog.

The reward computation component 72 computes an observed reward 42 based on the detected user act 28, if any.

The observation component 74 generates a new observation 16, based on the context and observed reward 42, and may incorporate the observation, or a representation derived therefrom, in supporting memory 54 of the model, e.g., when the reward 42 meets a predetermined threshold. Prior observations may be purged from the supporting memory, e.g., once the supporting memory reaches a preset number of observations.

The learning component 76 updates parameters of the model 12, e.g., based on a computed difference between the expected reward 80 and the observed reward 42 for the current observation 16. The learning component 76 may also be used to learn the model 12 initially, using an initial set of the observations 16.

The system 10 may include or be a part of a diadic dialog system for conducting a dialog between the agent and the user. Dialog systems of this type are described, for example, in U.S. Pub. Nos. 20150095033 and 20170091171, U.S. application Ser. No. 15/451,860, filed Mar. 7, 2017, entitled DIALOG STATE TRACKING WITH A PRIOR KNOWLEDGE-DRIVEN RELATIONAL REPRESENTATION LEARNING APPROACH, by Julien Perez, et al.; U.S. application Ser. No. 15/342,590, filed Nov. 3, 2016, entitled, PROBABILISTIC MATCHING FOR DIALOG STATE TRACKING WITH LIMITED TRAINING DATA, by Julien Perez, et al.; U.S. application Ser. No. 15/350,269, filed Nov. 14, 2016, entitled MACHINE READING METHOD FOR DIALOG STATE TRACKING, by Julien Perez; and Williams, et al., "Partially observable Markov decision processes for spoken dialog systems," Computer Speech & Language, 21(2):393-422, 2007, the disclosures of which are incorporated herein by reference in their entireties.

Figure 2:
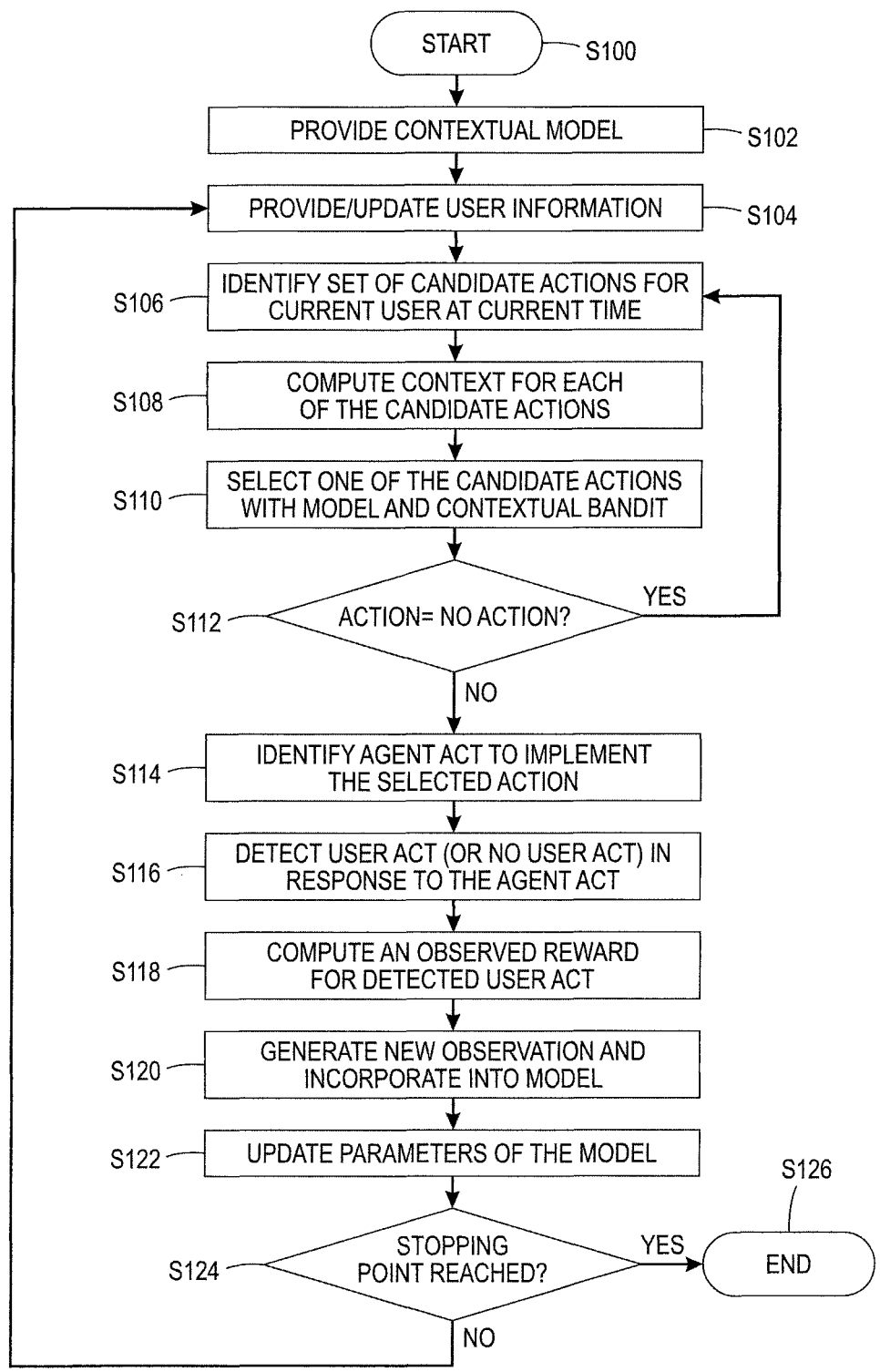
FIG. 2 is a flow chart illustrating a method for conducting a proactive interaction in accordance with another aspect of the exemplary embodiment.

With reference now to FIG. 2, a method for proactive interaction is illustrated. The method begins at S100.

At S102, a contextual model 12 is provided. This may include learning the model with an initial set of observations 16, with the learning component 76.

At S104, for each of a set of one, two or more users, user information 32 is provided. This may include generating and/or storing in memory a multidimensional vector representative of each user, with the user information component 60.

At S106, at a given time, for a current one of the set of users, a set of candidate actions 14 is identified, e.g., with the action identification component 62.

At S108, for a current user, a context 18 is computed for each of the candidate actions 14, e.g., with the context component 64.

At S110, one of the candidate actions Is selected, by inputting each context 18 into the current model 12, predicting a respective reward, and selecting one of the candidate actions with the contextual bandit 82 of the action prediction component 66.

At S112, if the selected action corresponds to no action, the method returns to S106, otherwise, the method proceeds to S114, where an agent act 24 is identified to implement the selected candidate action 14 and is output, e.g., by the output component 68.

At S116, a user act 28 (or no user act) in response to the agent act 24 is detected, e.g., by the act input component 70.

At S118, an observed reward 42 is computed, based on the detected user act 28 (or no user act).

At S120, if the observed reward 42 exceeds a threshold, a new observation 16 may be generated and incorporated into to the supporting memory.

At S122, the parameters of the model 12 may be updated by the learning component 76, based on the new observation.

If at S124, a stopping point has not been reached, the method may return to S104, where the user information may be updated, e.g., to reflect the user's interest in the selected action, and the steps S106-S122 may be repeated for one, two or more iterations, e.g., until a stopping point is reached.

The method ends at S126.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments, one or more of the steps may be at least partially performed manually, such as the provision of the user information.

As will be appreciated, the steps of the method need not all proceed in the order Illustrated and fewer, more, or different steps may be performed.

Further details of the system and method will now be provided.

A challenge of proactive interaction systems, such as proactive conversation systems is to make predictions based on only partial feedback. Given that there may be a large set of candidate actions (e.g., available subjects to address) and a variety of possible acts (e.g., recommendations to make), supported by a potentially large set of decision support variables, the exemplary system 10 is able to leverage on a partial feedback provided by the user in the form of user acts. Given an agent act, such as a suggestion made by the agent, the user will (generally) only provide a feedback for the given suggestion, i.e., the system does not receive feedback at that time for any of the other candidate actions. In such a setting, the system needs to solve a so-called exploration/exploitation dilemma. This means that the system is able to leverage on the already-gathered feedback to choose actions and associated acts that maximize the current expected reward (exploitation), while also being able to explore, i.e., to choose under-investigated actions to gather meaningful information about the user preferences and update the user information.

Another challenge is for the learnt decision model 12 to be able incorporate potentially long term Information from a history of client interactions, activities and their potential relationship to available prior knowledge. The exemplary system Incorporates supporting memory 54 which allows the model to base predictions on prior observations 16. The exemplary memory-enhanced contextual bandit-based model 12 enables the system 10 to respond to the dual problem of long term dependencies and partial feedback without the necessity of credit assignment learning.

First, a suitable contextual bandit 82 will be described, followed by a description of two exemplary models 12 with which the contextual bandit approach can be implemented.

Contextual Bandit

Formally, a contextual bandit algorithm A proceeds in discrete trials t=1, 2, 3, . . . , T. In the present case, T corresponds to a sequence of times.

In trial t:

1. The algorithm observes the current user $u_t$ and a set $A_t$ of arms (candidate actions 14) together with their feature vectors $x_{t,a}$ for $a \in A_t$. The vector $x_{t,a}$ (the context 18) incorporates both the information $U_t$ 20 of the user $u_t$ at time t, and the information $X_t$ 22 for arm a.

2. Based on observed rewards 42 in previous trials, the contextual bandit A chooses an arm (one of the candidate actions) $a_t \in A_t$, and receives an reward $r_{t,a_t}$ 42 whose expectation 80 depends on the context $x_{t,a_t}$.

3. The algorithm 82 improves its arm-selection strategy with the new observation 16 ($x_{t,a_t}$, $a_t$, $r_{t,a_t}$). It is noted that no feedback (i.e., no observed reward $r_{t,a}$) is observed for unchosen arms $a \neq a_t$.

In the process above, the total T-trial cumulative reward 56 of A can be defined as a cumulative payoff $P_A(T) = \Sigma_{t=1}^T r_{t,a_t}$, i.e., the cumulative sum of the observed rewards. Similarly, the T-trial cumulative payoff of an oracle that always chooses an arm with the best expected reward can be defined as $P_{A*}(T) = \Sigma_{t=1}^T r_{t,a_t^*}$, where $a_t^*$ is the arm with maximum expected reward at trial t. The goal is to design A so that the expected cumulative payoff $\mathbb{E}[P_A(T)]$ is maximized. Equivalently, an algorithm A could be designed whose reward is refined as a regret and where the expected regret with respect to the optimal arm-selection strategy A* is minimized. Here, the expected T-trial regret $R_A(T)$ of algorithm A can be defined by:

$$R_A(T) = \mathbb{E}[P_{A^*}(T) - P_A(T)] \quad (1)$$

A conventional contextual bandit is a K-armed bandit in which (a) the arm set $A_t$ remains unchanged and contains K arms for all t, and (b) the user $u_t$ (or equivalently, the context $(x_{t,1}, \ldots, x_{t,K})$) is the same for all t. Since both the arm set and contexts are constant at every trial, they make no difference to a bandit algorithm, and so this type of bandit is considered as a context-free bandit.

In the present contextual bandit, at least one of the user $u_t$ and the set of candidate actions $A_t$ is different for one or more of the trials.

There are other limitations of the classic framework of contextual bandits which can be addressed in the current system. First, it may not be necessary or desirable to model a potentially long history of interactions as part of the decision support. For example, in the context of a personal assistant, a conversation engagement (agent act) could be triggered regarding a very recent event, such as the time-matching of a calendar event or the current GPS location of the user. However, longer patterns from a series of events occurring over time could motivate a suggestion. In such a situation, it is difficult to define a priori the optimum time window of observations to consider. Second, previous success may be explicitly incorporated into an episodic memory and used as decision support to the reward estimation function. These concerns can be addressed by a learnable parametric reward function that incorporates such a differentiable memorization mechanism.

Memory Enhancement

The supporting memory 54 of the model 12 can be use in different ways. In one embodiment, the model incorporates a memory-enhanced neural network. Neural networks used in general reinforcement learning can be adapted for use in the model 12. See, Matthew J. Hausknecht, et al., "Deep recurrent Q-learning for partially observable MDPs, ArXiv1507.06527, Sequential Decision Making for Intelligent Agents Papers from the AAAI 2015 Fall Symp., pp. 29-37, 2015; Ivan Sorokin, et al., "Deep attention recurrent Q-network. ArXiv 1512.01693, pp. 1-7, 2015; Junhyuk Oh, et al., "Control of memory, active perception, and action in minecraft," Proc. 33rd Int'l Conf. on Machine Learning (ICML 2016), pp. 2790-2799, arXiv:1605.09128, 2016, as examples of memory-enhanced neural networks. Such recurrent neural networks can be used to automatically accumulate observations through time and learn to use a memory to support decision making in a differentiable manner.

Two reward function models 12 that incorporate such a memorization capability will now be described.

Convolutional Selective Memory Network

Figure 3:
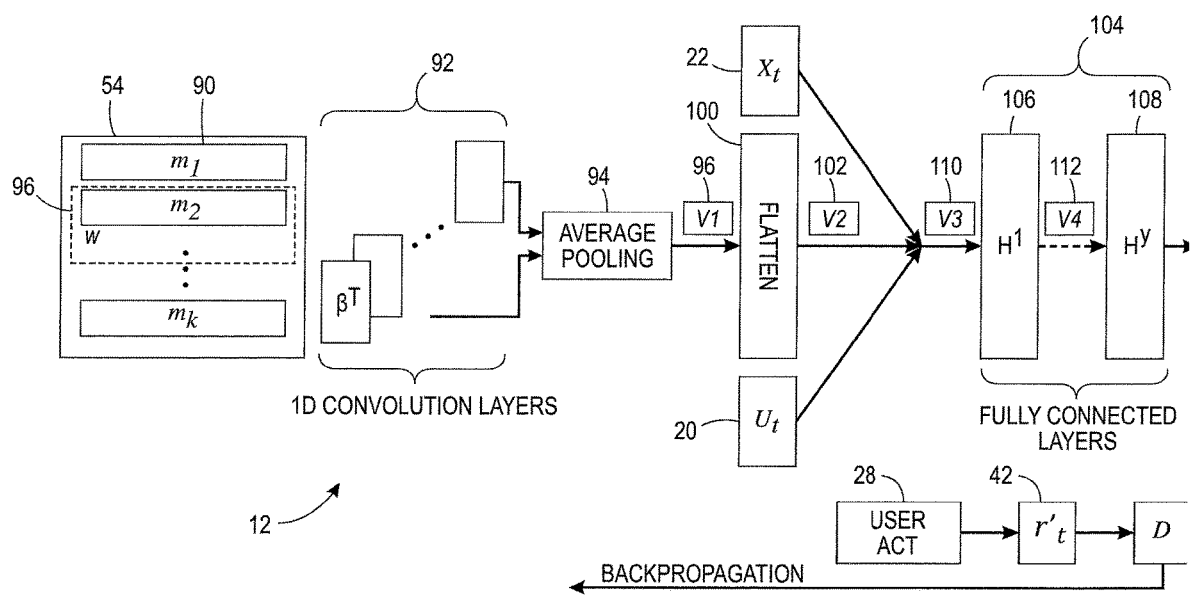
FIG. 3 illustrates a contextual model in accordance with one aspect of the exemplary embodiment.

FIG. 3 illustrates a first model 12 in the form of a Convolutional Selective Memory Network (CSMN). The model merges three information sources. First, $X_t$ and $U_t$ correspond respectively to the features of the action $a_t$ and the user $u_t$, both observed at time t. In addition, a record of the last K successful engagements of the agent with the corresponding user are stored in a list of memory blocks 90, denoted $M_{u_t} = \{m_1, \ldots, m_K\}$. Such memory blocks may correspond to (at most) K latest contexts $x_s$, (s<t) for which the observed rewards $r_s$ 42 have been greater than a threshold $\gamma \in \mathbb{R}$, which may be determined through cross validation.

The model 12 includes one or more 1-dimensional convolutional layers 92, optionally followed by an average pooling layer 94. The layers 92, 94 are used to aggregate meaningful higher level features from the past successful contexts stored in the memory cells 90. The model architecture can be based on that described in Yoon Kim, "Convolutional neural networks for sentence classification," Proc. 2014 Conf. on Empirical Methods in Natural Language Processing (EMNLP), ACL, pages 1746-1751, 2014.

Let $m_i \in \mathbb{R}^z$, z be the z-dimensional vectors describing the individual observations 16 incorporating the contexts. The memory 54 can then be represented as:

$$m_{1:n} = m_1 \oplus m_2 \oplus \ldots \oplus m_n, \quad (2)$$

where n≤K and n is the number of observations currently represented in the supporting memory, and $\oplus$ represents the concatenation operator, i.e., the input to the convolutional layers is a concatenation of the vectors 90 currently stored in the supporting memory 54. Let $m_{i:i+j}$ refer to the concatenation of observations $m_i, m_{i+1}, \ldots, m_{i+j}$.

Each convolutional layer 92 performs a convolution operation. The operation involves a filter $\beta \in \mathbb{R}^{hz}$, which is applied to a respective window w 96 of the observation representations 90 to produce a new feature. The window w is of varying size, e.g., from h to n observations. Each filter θ thus applies a different window size. For example, a feature $c_i$ is generated from a first window of h1 stored observations $m_{i:i+h1}$ by:

$$c_i = f(\beta^T \cdot m_{i:i+h1} + g), \quad (3)$$

where $g \in \mathbb{R}$ is a bias term and $f$ is a non-linear function, such as the hyperbolic tangent (tan h). $\beta^T \cdot m_{i:i+h1}$ is the dot product of filter vector $\beta^T$ and observation vector $m_{i:i+h1}$. The filter $\beta^T$ may be applied to each possible window of observations stored into the memory $\{m_{1:h}, m_{2:h+1}, \ldots, m_{n-h+1:n}\}$ to produce a feature map:

$$c = [c_1, c_2, \ldots, c_{n-h+1}], \quad (4)$$

where $c \in \mathbb{R}^{n-h+1}$.

The average pooling layer 94 applies an average pooling operation over the feature map c. The maximum value $$\hat{c} = \frac{1}{n-h+1} \sum_{i=1}^{n-h+1} c_i$$

is taken as the feature corresponding to the respective filter $\beta^T$. The purpose is to capture the most important feature, one with the highest value, for each feature map.

The output V1 98 of the average pooling layer 94 is thus a vectorial representation of the important features of the set of observations stored in memory 54. The vector 98 may be processed by a flattening layer 100, such as a Softmax function:

$$f(x) = \frac{1/e^{-x}}{\sum_{i=1}^{n} 1/e^{-i}},$$

to output an observation description vector V2 102.

A set 104 of one or more fully-connected layers 106, 108, etc., denoted $H^1$, $H^2$, etc., receives as input the observation description vector V2 102 and the current context 18, represented by $U_t$ 20 and $X_t$ 22. The vectors V2, $U_t$, and $X_t$ may be concatenated or otherwise aggregated to form a single input vector V3 110. While two fully-connected layers 106, 108 are illustrated, a suitable number y of fully-connected layers, such as from 1 to 10 fully-connected layers, can be determined by cross-validation.

Each fully-connected layer 106, 108 comprises a tensor of weights, such as a matrix of weights. The weights of each fully-connected layer are part of the parameters of the model 12 to be learned (together with the parameters of the convolutional layers 92, such as filter vectors β and bias term b). The first fully-connected layer 106 takes as input V2, $U_t$, and $X_t$ and outputs an attention map 112, which is a dot product between the input of the model $X_t$ and the values into the memory. The attention map is then input to the next fully-connected layer 106, and so forth. The final layer converts the input map to a single value, the expected reward $r_t$ 80. In particular, the reward $r_t$ is computed as a matrix multiplication between the last state of the controller and a parameter matrix. During training, a difference between the expected reward $r_t$ 80 and the observed reward $r_t'$ 42 for the selected action may be used to update the parameters of the model, e.g., through backpropagation of errors through the fully connected layers and convolutional layers. The reward $r'_t$ can be computed as a dot product between the latent representation of the user and the latent representation of the topic (see examples below).

The model 12 can thus be considered as a late fusion of old contexts with a current candidate action and user features. One drawback of late fusion is that the memories are not specifically selected regarding the current context. To address this, an adaptation of an attention-based model is now described.

Contextual Attentive Memory Network

Figure 4:
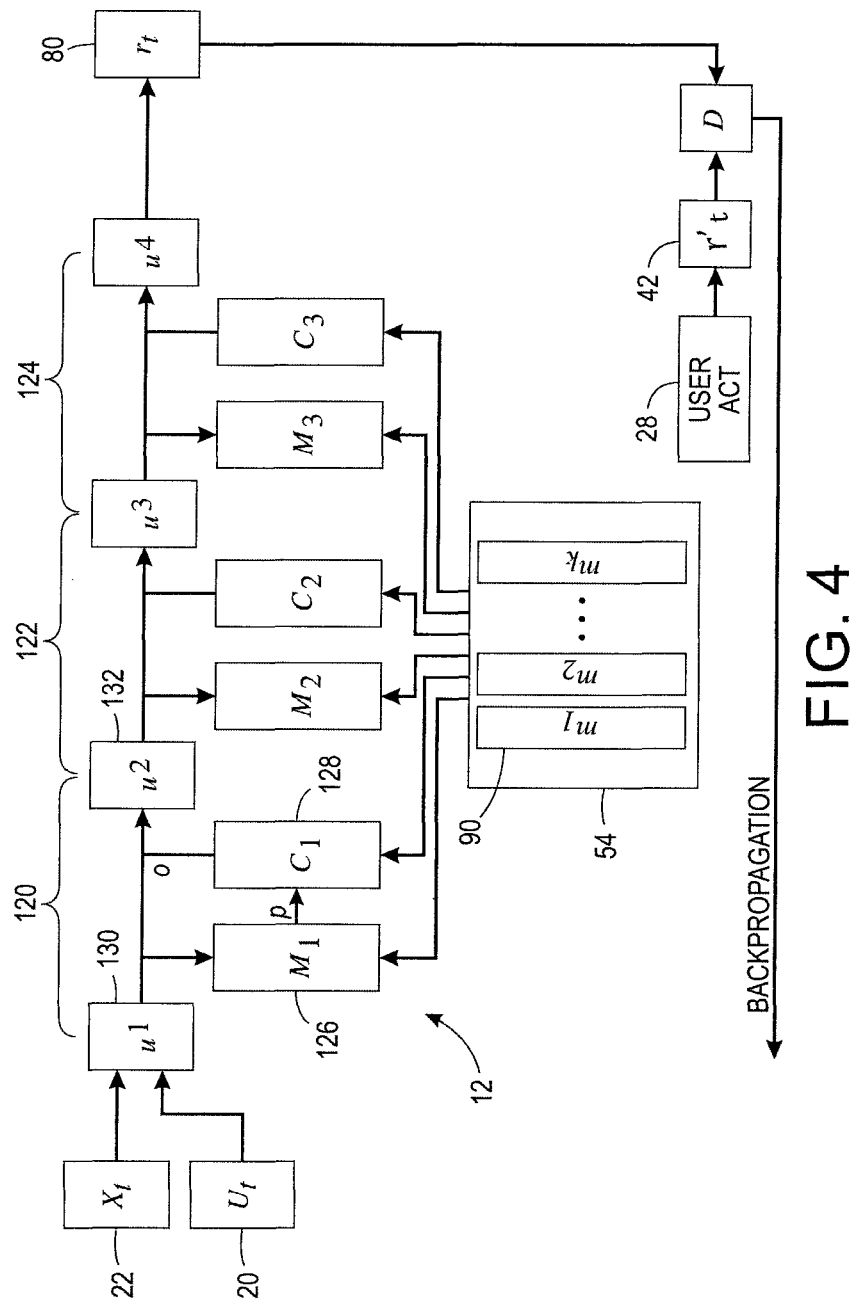
FIG. 4 illustrates a contextual model in accordance with another aspect of the exemplary embodiment.

With reference now to FIG. 4, a model 12 in the form of a Contextual Attentive Memory Network illustrated. This can be configured similarly to the Gated End-to-End Memory Network architecture, described in Fei Liu, et al., "Gated end-to-end memory networks," Proc. 15th Conf. of the European Chapter of the Assoc. for Computational Linguistics (EACL 2016), Vol. 1, Long Papers, pp. 1-10, 2016, which itself is an extension of the network described in Sainbayar Sukhbaatar, et al., "End-to-end memory networks," Advances in Neural Information Processing Systems (NIPS), 28, pp. 2440-2448, 2015.

The CAMN model 12 includes supporting memory 54, which can be configured similarly to that of the model of FIG. 2. Each of a set of hops 120, 122, 124, includes supporting memory 126, 128. The supporting memory stores a representation of each of a set of past observations for which there is an observed reward for a respective user for a respective action selected from a set of candidate actions. The supporting memory includes input and output supporting memories 126, 128 with memory cells which store input and output memory representations, respectively. The input and output memory cells, denoted by $m_i$ and $c_i$, of supporting memories 126, 128, are obtained by transforming the input context $x_1, \ldots, x_n$ (i.e., a set of observations) stored in memory blocks 90 using two embedding matrices A and C (both of size d×|V|, where d is the embedding size and |V| the observation size), such that $m_i = \Phi_A(x_i)$ and $c_i = \Phi_C(x_i)$ where $\Phi(\cdot)$ is a function that maps the input into a vector of dimension |V|.

Similarly, the user information $U_t$ and action information $X_t$ (the current context x) are concatenated and encoded using another embedding matrix $B \in \mathbb{R}^{d \times |V|}$, resulting in a context embedding 130 $u^1 = \Phi_B(q)$, where q represents the concatenation (or other aggregation) of $U_t$ and $X_t$. The input memories $\{m_i\}$ 126 together with the embedding $u^1$ of the context, are utilized to determine the relevance of each of the history of observations that are embedded into the memory cells 126, yielding in a vector $p_i$ of attention weights:

$$p_i = \text{softmax}(u^T m_i), \quad (5)$$

Where T represents the transpose and $$\text{softmax}(a_i) = \frac{e^{a_i}}{\Sigma_i e^{a_i}},$$

i.e., each value of $p^1$, is computed as the dot product of the respective values of $u^1$ and $m_i$, which can be converted to a value between 0 and 1 using the softmax function. Subsequently, the response o from the output memory is constructed by the weighted sum:

$$o = \Sigma_i p_i c_i, \quad (6)$$

i.e., computing, for each of the output memory cells $c_i$, the product of $p_i$ and $c_i$, then computing a linear combination of the results.

The controller state vector output $u^2$ output from the first hop 120 can be used as the input of a second hop 122, and so forth, so that the $(k+1)^{th}$ hop takes as input the output $u^k$ of the $k^{th}$ hop. The output $u^{k+1}$ of a given hop can be computed based on the output $o^k$ of the supporting memory 128 and the input controller state $u^k$, by first computing the gate transform:

$$T^k(u^k) = \sigma(W_T^k u_T^k + b_T^k) \quad (7),$$

then computing the output controller state:

$$u^{k+1} = o^k \odot (T^k(u^k)) + u^k \odot (1 - T^k(u^k)), \quad (8)$$

where $\odot$ denotes the Hadamard (elementwise) product, $\sigma(x) = (1+e^{-x})^{-1}$ (where x denotes the content in parentheses in Eqn. 7), $W_T^k$ and $b_T^k$ are a hop-specific parameter matrix and a bias term for the $k^{th}$ hop, and $T^k(u^k)$ is a transform gate for the $k^{th}$ hop. The vectorization sigmoid function may be used to reduce the influence of extreme values or outliers in the data without removing them from the data set and to generate an output $T^k(u^k)$ e.g., of from 0 to 1. In one embodiment, $0 < T^k(u^k) < 1$ for one or all of the hops.

Two types of weight tying schemes can be used for $W_T^k$ and $b_T^k$:

1. Global: all the weight matrices $W_T^k$ and bias terms $b_T^k$ are shared across different hops, i.e., $\forall k, l \in \{1, \ldots, K\}$ $W_T^k = W_T^l$ and $b_T^k = b_T^l$.

2. Hop-specific: each hop k has its specific weight matrix $W_T^k$ and bias term $b_T^k$, and they are optimized independently.

See, Sainbayar Sukhbaatar, et al., "End-to-end memory networks," Advances in Neural Information Processing Systems (NIPS), 28, pp. 2440-2448, 2015.

As the final step, the prediction of the expected reward $r_t$ for the input context, is computed by:

$$r' = (u_K^T W'),$$

where $W' \in \mathbb{R}^d$ is part of the parameters for the model to learn.

Such a model allows for a non-Markovian hypothesis in the context definition. In the examples below, the Contextual Attentive Memory Network model is used to implement a goal-oriented proactive dialog agent. By way of example.

The learning of the model 12 includes updating model parameters such as weight matrices $W_T^k$, weight vector W', bias terms $b_T^k$ and transform gate parameters $T^k$. Learning may be performed by backpropagation of errors, as for the model of FIG. 3.

Exploration Policies

A challenge in bandit problems is the optimal balancing of exploration and exploitation. To minimize the regret in Eq. (1), an algorithm A would exploit its past experience to select the arm that appears the best. However, this seemingly optimal arm may in fact be suboptimal, due to incompleteness of A's knowledge. In order to make informed decisions, A also performs exploration by sometimes choosing seemingly suboptimal arms in order to gather more information about them (see, step 3 in the bandit process defined above). This exploration can increase short-term regret/decrease short-term payoff since some suboptimal arms may be chosen, but obtaining information about the arms' average rewards will later enhance A's capability to reduce long term regret/increase long-term payoff. Clearly, neither a purely exploring nor a purely exploiting algorithm works best in general but a good trade-off can be selected.

One suitable sampling method which can be used to achieve such a trade-off is Thompson sampling, which is a Bayesian heuristic to achieve a successful exploration/exploitation trade-off. See, Olivier Chapelle, et al., "An empirical evaluation of Thompson sampling," Advances in neural information processing systems (NIPS), pp. 2249-2257, 2011; Shipra Agrawal, et al., "Thompson sampling for contextual bandits with linear payoffs," ICML, vol. 28 of JMLR Workshop and Conf. Pro., pp. 127-135, 2013.

Let D be the set of past observations $(x_{t,a}, a_t, r_{t,a})$, where $x_{t,a}$ is the context in which the arm $a_t$ was pulled yielding the reward $r_t$. Thompson sampling assumes a likelihood function $P(r|a, x_{t,a}, \mathcal{F})$ parameterized by $\mathcal{F}$ for the reward. Denoting the true parameters by $\mathcal{F}^*$, it would be ideal to be able to choose an arm that maximizes the expected reward $\text{argmax}_a E[r|a, x_{t,a}, \mathcal{F}^*]$. However, since the true parameters are unknown, the belief about it can be described by a prior distribution $P(\mathcal{F})$. Then, based on the observed data D, this belief is updated by the Bayes rule: $P(\Theta|D) \propto P(\mathcal{F}) \Pi_{t=1}^{T} P(r|x_{t,a}, a_t, \mathcal{F})$. If the aim was only to maximize the immediate reward, it would be desirable to choose an arm that maximizes $E[r|a, x_{t,a}] = \int E(r|a, x_{t,a}, \mathcal{F}) P(\mathcal{F}|D) d\mathcal{F}$. However, in an exploration/exploitation setting, an arm a is chosen according to its probability of being optimal, i.e., with probability:

$$\int \mathbb{I}_{[E(r|a, \mathcal{F})=\text{argmax}_{a'} E[r|a', \mathcal{F}]]} P(\mathcal{F}|D) d\mathcal{F} \quad (9)$$

In practice, it is not necessary to calculate the integral. Rather, it suffices to draw a random parameter $\mathcal{F}$ from posterior distribution $P(\mathcal{F}|D)$ and then select the arm with the highest expected reward $E[r|a, x_{t,a}, \mathcal{F}]$. The general framework of Thompson sampling is described in Algorithm 1.

| Algorithm 1: Thompson Sampling |
|---|
| // counter T = 0.<br>Define D = { }<br>repeat<br>   receive context $x_{t,a}$<br>   draw $\mathcal{F}$ from posterior distribution $P(\mathcal{F}|D)$<br>   select arm $a_t = \text{argmax}_a E(r|x_{t,a}, a, \mathcal{F}_t)$<br>   receive reward $r_t$<br>   $D = D \cup \{x_{t,a}, a_t, r_t\}$<br>until $T > T_{max}$ |

In the examples below, Thompson sampling is used as the exploration/exploitation policy for proactive dialog management. In the following, a model 12 suited to proactive dialog learning is described.

Goal-Oriented Proactive Dialog Policy

In a proactive dialog system, an agent has to periodically choose whether and how to interact with the user at time t. Its choices are picked from among eligible actions over the current context $x_{t,a} \in X$ and a history of past contexts $x_1, \ldots, x_{t-1} \in H$. To do so, the agent needs to learn a function $f_\theta: \{H, X_A\} \to \mathbb{R}$ which estimates the expected reward 80 associated with a candidate action a and memorized history 54, where θ represents the parameters of the model 12.

Employing the contextual bandit, the agent estimates the expected reward of an action 14 through the feedback of the user (user act 28). The goal is to accumulate positive rewards for the chosen conversational engagements. Feedback can be explicit, such as a positive or a negative response, implicit, or even no response at all. An example of an implicit positive feedback might be the observed change in travel trajectory in the case of the suggestion of place during travel.

As will be appreciated, by allowing exploration through use of the contextual bandit, the system may influence the preferences of its user. Thus, in one embodiment, the latent variables 20 describing the user may be modified over time, rather than being fixed. Similarly, the action representation 22 of a given action may be modified, over time, to reflect the changing interests of the general population.

Without intending to limit the scope of the exemplary embodiment, the following example illustrates application of the exemplary system and method to a proactive recommendation system for a traveler.

Examples

A prototype system 10 was developed for making recommendations to a traveler. The purpose was to simulate the spontaneous engagement of a personal assistant with its user regarding situational recommendations near the user's geographic location. The system simulates a city where a user follows a series of trajectories composed of waypoints. Points of interest (candidate actions) are identified that may be suggested to user when they arrive at their vicinity. The goal of the agent, in this example, is to propose actions regarding the inferred latent variables of the user (user information 20) representing the user's interests. In these experiments, the user information 20 is fixed, and is not updated over time.

In order to enrich the prototype system with realistic elements of information, 6000 reviews were extracted from Google Map Place API for the city of New York corresponding to four types of places: restaurant, bar, pub, cafe, for a total of 5000 places. A topic model based on Latent Dirichlet Allocation was computed from these reviews (David M. Blei, et al., "Latent Dirichlet Allocation," J. Machine Learning Research 3:993-1022, 2003). The topic distributions were used (1) as latent variables representing the user interests and (2) as latent variables representing the places. To identify meaningful topics to characterize different types of places, a lexicon of emotion-related words was defined and bigrams containing these words were extracted from reviews by a single user of the four types of places and reviews generated by users for each of the 5000 places. TABLE 1 gives a sample of the latent topics and bigrams extracted for each.

TABLE 1

Top representative bi-grams of set of 15 topics extracted from reviews. Each topic corresponds to a latent center of interest of the user and observed description of the places

| Topic | Top 10 Bi-grams |
|---|---|
| 1 | dim_sum, late_night, 20_minutes, took_long, large_groups, wednesday_night, sweet_potato_fries, potato_fries, sweet_potato, beer_pong |
| 2 | happy_hour, russ_daughters, tables_available, drinks_happy_hour, drinks_happy, group_people, lyft_credit, open_table, portions_huge, lamb_shank |
| 3 | live_music, beers_tap, gluten_free, little_italy, small_cozy, cheap_drinks, main_course, drinks_bar, cooked_perfectly, group_friends |
| 4 | saturday_night, dining_experience, prix_fixe, selection_drinks, stay_away, small_portions, beca_friend, huge_selection, portions_small, sat_bar |
| 5 | french_toast, date_night, hip_hop, don_come, outdoor_seating, cozy_little, second_floor, date_spot, ve_tried, marinara_sauce |
| 6 | east_village, dining_area, beer_bar, old_school, financial_district, statue_liberty, long_wait, craft_beer, goat_cheese, hole_wall |
| 7 | selection_beers, small_plates, cool_spot, grab_meal, drinks_music, healthy_lunch, fresh_air, soup_dumplings, lobster_roll, breath_fresh |
| 8 | fried_chicken, hang_friends, tuna_melt, peanut_butter, grab_drink, cocktail_bar, free_wifi, week_lunch, eggs_benedict, cheese_plate |
| 9 | sitting_bar, cup_coffee, bloody_mary, took_care, little_slow, fish_dishes, makes_feel, cold_brew, course_tasting, wide_variety |
| 10 | avocado_toast, low_key, chocolate_cake, ve_seen, happy_hour, fried_egg, large_group, new_people, meet_new, ho_ketchup |
| 11 | coffee_shop, free_lyft, bar_bartender, pasta_dish, fish_chips, cool_atmosphere, cute_little, atmosphere_music, bartender_drinks, brooklyn_bridge |
| 12 | happy_hour, wine_list, went_lunch, friday_night, hour_specials, happy_hour_specials, people_watching, bars_city, bread_pudding, people_don |
| 13 | 10_minutes, bar_tenders, dining_room, bar_area, fun_atmosphere, minutes_later, atmosphere_drinks, soup_salad, birthday_party, steak_sandwich |
| 14 | ice_cream, just_right, make_feel, feel_welcome, little_cafe, wonderful_experience, did_job, mac_cheese, 15_20, bar_bit |
| 15 | beer_selection, dive_bar, wine_bar, wine_selection, free_lyft, neighborhood_bar, irish_pub, irish_irish, little_expensive, walked_away |

The topic model is used to sample keywords that act as observations of places. TABLE 2 gives examples of places with their corresponding latent topics and observed keywords. A simulated user is defined by a distribution over the latent topics which correspond to his center of interest. For the places, a distribution of latent topics is drawn from the topic model and a series of observable keywords are sampled from the LDA topic model accordingly. In such a way, the personal assistant has access to a set of topic related keywords of each place of the simulated city. Its goal is to infer the latent centers of interest of the user by recommending corresponding places as the user passes nearby. The reward r associated to a user latent center of Interest vector U and the latent topic vector X of a given place is computed by: $r = U^T X + \varepsilon$ with $\varepsilon \sim \mathcal{N}(0, \sigma^2)$ and $\sigma \in \mathbb{R}$ is the predefined variance parameter of a Gaussian distributed noise.

TABLE 2

Four places with main latent topics and observed sampled keywords

| Topics | Keywords |
|---|---|
| 8 | bloody_mary canned_tuna cheap_beer chips_typical_nyc come_friends cool_spot east_village french_toast gigantic_portion gluten_free happy_hour house_wine kind_hospitality little_expensive olive_oil ordered_burger outdoor_seating sandwich_steak_salad second_floor spot_brunch standard_bar strawberry_shake usual_bar vegetarian_options veggie_burger |

TABLE 2-continued

Four places with main latent topics and observed sampled keywords

| Topics | Keywords |
|---|---|
| 16 | attentive_drinks awesome_spot bar_bit cafe_mocha coffee_shop cool_bar fish_dishes french_toast library_hotel_vacation long_wait pretty_expensive relaxed_bar scrambled_eggs seating_inside selection_wine spot_city sunday_night water_refills went_sunday |
| 11 | appetizer_entree bars_city beer_selection beet_relish cozy_spot dance_floor downtown_tavern fresh_squeezed fried_egg jazz_band large_group red_wine small_beer small_space steak_tartare took_forever usually_crowded ve_nyc vegan_options went_week wine_bars |
| 6 & 8 | atmosphere_pleasant authentic_japanese bar_big bathrooms_clean cheese_steak craft_beer dim_sum drinks_decent free_wifi hang_friends happy hour little_gem lot_fun pint_guinness poached_egg salad_pattern_did seat_bar seating_available soup_dumplings sunday_night |

Algorithm 2 describes the course of a simulation. The user performs a series of travels composed with waypoints into the city. At each waypoint of the trajectory, the agent has to decide whether to make a recommendation regarding a place nearby the current location of the user. If a recommendation is decided, the corresponding r is computed and presented as instantaneous reward to the personal assistant. The agent progressively learns, from its experience, the expected reward of such a context. In practice, such a reward could be formulated in a real environment as the explicit acceptance by the user or refusal. The addition of the noise to the reward function helps to simulate the challenge of interpretation of a user feedback in a realistic setting. The dialog act of the agent entails proposing a place near the current user position.

---

Algorithm 2: Simulation Dynamics

H = { }
for e: 1, ... , TotalNumberOf Epochs do
    sample user $u_e \in U$
    sample trajectory $p_1, ... , p_T$
    for t: 1, ... , T do
        extract the n places $(q_1, ... , q_n)$ closest to $p_t$
        draw θ from Thompson sampling
        choose $q^* = \mathrm{argmax}_{q_i} f_\theta(u_e, q_i)$
        observe reward $r_t$
        H = H ∪ $\{(u_t, q^*, r_t)\}$
    end for
end for

---

In this algorithm, multiple users are considered. The algorithm samples a user and a trajectory (between waypoints). A set of n places closest to the trajectory are identified from a map. For the experiments, 500 places are sampled over a square area composed with 300 waypoints. Users' trajectories are computed on-the-fly over sampled departure and arrival locations using a shortest path algorithm. The nearby candidate locations at each waypoint are determined using a fixed radius around the user location. A total of 50 users are sampled for each experiment. Finally, each experiment involves a total of 1000 trajectories which correspond to the number of epochs. Each experiment is relaunched 5 times for variance estimation. Regarding the learning algorithms, hyper-parameters have been determined by cross-validation. The CSMN model employed uses 64 filters of width 3 cells 90 in its convolution layer 92 and four hidden layers 106, 108, etc., in its fully connected part 104 with 100 hidden units each. The CAMN model uses 3 hops 120, 122, 124 with an embedding size of 30. The hop-specific weight tying scheme was employed.

Figure 5:
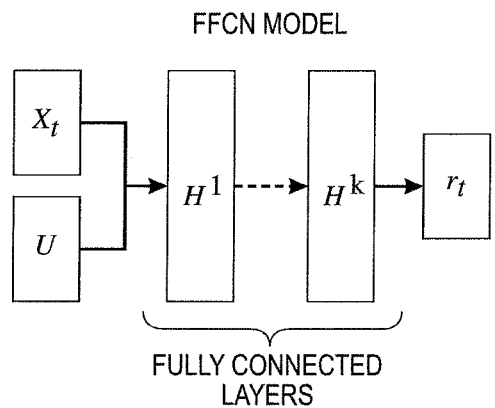
FIG. 5 illustrates a memory-free model.

Four methods were evaluated:
1. A random baseline method.
2. A baseline method using a Fully Connected Neural Network, FFCN, is a multi-layer perceptron which merges the action features $X_t$ and the user features U into the input layer of the model (FIG. 5) and computes the expected reward of this corresponding context.
3. Method using the exemplary CSMN model.
4. Method using the exemplary CAMN model.

Figure 6:
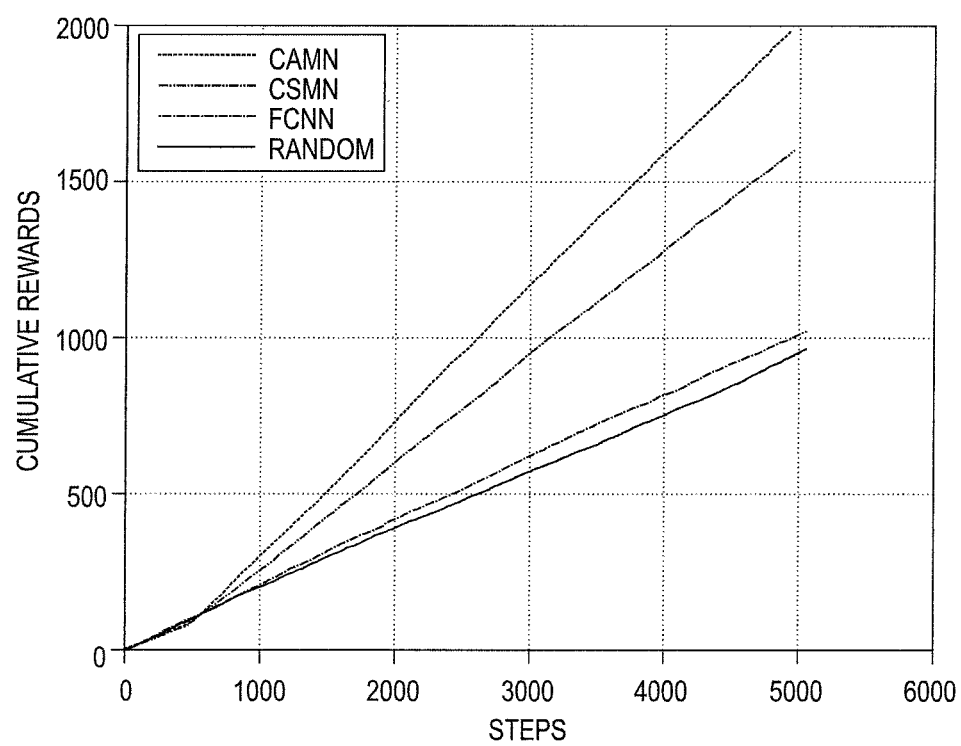
FIG. 6 shows the mean cumulative sum of rewards for four prototype systems for conducting a proactive interaction.

FIG. 6 is a plot the cumulative sum of rewards for the four considered methods. As expected, the random method performed poorly. The baseline method using FFCN did not perform much better than the random baseline. Using a selective memory mechanism, as in the CSMN and CAMN models, improves performance over a neural contextual bandit. Having a fixed sized memory over the past successfully selected places, as in the CSMN model, is a useful addition as decision support. The attention-based model of the contextual memory bandit (CAMN) is particularly beneficial. The capability to have an unbounded memory with a differentiable attention mechanism improves the observed cumulative rewards. These were seen to increase exponentially, after an initial learning period.

The experiments suggest that a system in which the personal agent is in charge of emitting spacio-temporally motivated recommendations can be implemented with both of the exemplary models.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A proactive interaction system comprising:
a contextual model stored in system memory, the contextual model including supporting memory, the supporting memory storing, as memory cells of the supporting memory, a respective vectorial representation of each of a set of past observations, wherein for each of the set of past observations, there is an observed reward for a respective user for a respective candidate action selected from an identified set of candidate actions, the contextual model configured for estimating a reward for each of a current set of candidate actions based on the stored vectorial representations of past observations and a representation of a current user, each of the candidate actions being associated with a respective action representation;
instructions stored in system memory including:
a contextual bandit which selects one of the current set of candidate actions based on the estimated reward for each of the current set of candidate actions to optimize a cumulative reward over a sequence of candidate action selections;
an act output component which outputs an agent act based on the selected one of the current set of candidate actions, the act output component including components which generate an agent utterance in a natural language as the agent act, unless the selected candidate action is for no action;
a user act input component which detects a user act in the form of user utterance responsive to the agent act;
the proactive interaction system being configured to advance a dialog with the user by generating further agent acts, based on the user utterance; and
a hardware processor which implements the instructions.

2. The system of claim 1, further comprising at least one of:
a reward computation component which computes an observed reward for the selected action based on an observed user response to the agent act; and
an observation component which updates the supporting memory with a vectorial representation of a new observation for the user and selected action, based on the reward.

3. The system of claim 2, wherein the observed user response is an utterance.

4. The system of claim 1, wherein the contextual model includes a memory-enhanced neural network.

5. The system of claim 4, wherein the memory-enhanced neural network includes an attention mechanism.

6. The system of claim 1, wherein the supporting memory comprises sets of input and output memory cells that are generated from respective observations with respective transformations.

7. The system of claim 1, wherein the vectorial representations of each of a set of past observations are each derived from both a representation of a user and a representation of an action.

8. The system of claim 1, wherein the instructions further comprise a user information component which generates the representation of the user.

9. The system of claim 1, wherein the instructions further comprise an action identification component which identifies a respective set of at least two candidate actions for each of a plurality of times, from which the one of the candidate actions is selected.

10. The system of claim 1, wherein the instructions further comprise a learning component which updates parameters of the model based on the estimated reward and observed reward.

11. The system of claim 1, wherein the agent actions are related to points of interest and events.

12. The system of claim 1, wherein the system, for each of a plurality of times, selects a candidate action and outputs a user-detectable act based on the selected candidate action.

13. The system of claim 1, wherein the set of candidate actions includes at least two candidate actions.

14. The system of claim 13, wherein the set of candidate actions includes a candidate action corresponding to no action and wherein when the selected candidate action is the candidate action corresponding to no action, the agent act corresponds to no act being output.

15. A proactive interaction method comprising:
providing, in system memory, a contextual model, the contextual model including supporting memory, the supporting memory including, for each of at least two hops, input and output supporting memories, storing respective input and output memory cells therein, the memory cells storing input and output representations of each of a set of past observations for which there is an observed reward for a respective user for a respective action selected from a set of candidate actions, the input and output representations being obtained by transforming each of the set of past observations with respective embedding matrices, the contextual model configured for estimating a reward for each of a set of candidate actions based on the stored input and output representations of past observations and a representation of a current user, each candidate action being associated with a respective action representation;

for a sequence of iterations, with a hardware processor:
   for a current user, with the model, computing an expected reward for each of a current set of at least two candidate actions; and
   for at least one iteration in the sequence of iterations:
      sampling one of the candidate actions based on the estimated reward for each of the set of candidate actions to optimize a cumulative reward over a sequence of candidate action selections,
      outputting an agent act, based on the selected one of the candidate actions, the agent act comprising an utterance in a natural language,
      computing a reward for the selected action based on an observed user response to the agent act, and
      updating the supporting memory with input and output representations of a new observation for the user and selected action, based on the reward, and
   advancing a dialog with the user by generating further agent acts, based on the observed user response to the agent act.

16. The method of claim 15, wherein for at least one of the sequence of iterations, the selected action is no action and no agent act is output.

17. The method of claim 15, wherein the computing of the expected reward, sampling one of the candidate actions, computing a reward for the selected action, and updating the supporting memory are performed with a processor.

18. A vehicle comprising the proactive interaction system of claim 1.

* * * * *